US011238175B2

(12) United States Patent
Xie et al.

(10) Patent No.: US 11,238,175 B2
(45) Date of Patent: Feb. 1, 2022

(54) FILE SYSTEM PERMISSION SETTING METHOD AND APPARATUS

(71) Applicant: Huawei Technologies Co., Ltd., Shenzhen (CN)

(72) Inventors: Xiaoqin Xie, Beijing (CN); Hongxing Guo, Beijing (CN); Yongjian Li, Beijing (CN); Mantang Ma, Beijing (CN); Zhiting Lu, Beijing (CN); Junwei Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 16/718,995

(22) Filed: Dec. 18, 2019

(65) Prior Publication Data

US 2020/0125758 A1 Apr. 23, 2020

Related U.S. Application Data

(63) Continuation of application No. PCT/CN2018/076743, filed on Feb. 13, 2018.

(30) Foreign Application Priority Data

Jun. 30, 2017 (CN) .......................... 201710526991.0

(51) Int. Cl.
*G06F 15/16* (2006.01)
*G06F 21/62* (2013.01)
(Continued)

(52) U.S. Cl.
CPC ...... *G06F 21/6218* (2013.01); *G06F 16/1827* (2019.01); *H04L 63/101* (2013.01); *H04L 67/1097* (2013.01)

(58) Field of Classification Search
CPC ............... H04L 67/1097; H04L 63/101; G06F 21/6218; G06F 16/1827
(Continued)

(56) References Cited

U.S. PATENT DOCUMENTS

| 8,386,526 B2 * | 2/2013 | Shinjo ................. G06F 11/1448 707/797 |
| 10,498,535 B2 * | 12/2019 | Bohli ...................... G06F 21/30 |

(Continued)

FOREIGN PATENT DOCUMENTS

| CN | 1567255 A | 1/2005 |
| CN | 1605992 A | 4/2005 |

(Continued)

OTHER PUBLICATIONS

Machine Translation and Abstract of Chinese Publication No. CN1567255, Jan. 19, 2005, 11 pages.
(Continued)

*Primary Examiner* — Moustafa M Meky
(74) *Attorney, Agent, or Firm* — Conley Rose, P.C.

(57) ABSTRACT

A data access method in a file system comprises receiving a data access request including an identifier of a to-be-accessed node, obtaining access permission for the to-be-accessed node based on the identifier of the to-be-accessed node, wherein when a permission version number of the to-be-accessed node is not the latest in permission version numbers of all nodes indicated by path information of the to-be-accessed node in a file system, the access permission for the to-be-accessed node inherits a permission record corresponding to a parent node that is of the to-be-accessed node and that has a latest permission version number, and performing authentication based on the access permission for the to-be-accessed node, and accessing data of the to-be-accessed node after the authentication succeeds.

20 Claims, 4 Drawing Sheets

(51) Int. Cl.
    *G06F 16/182* (2019.01)
    *H04L 29/06* (2006.01)
    *H04L 29/08* (2006.01)

(58) Field of Classification Search
    USPC .......................................................... 726/4
    See application file for complete search history.

(56) References Cited

U.S. PATENT DOCUMENTS

| | | | |
|---|---|---|---|
| 2005/0086536 A1 | 4/2005 | Wu | |
| 2010/0042598 A1* | 2/2010 | Shinjo | G06F 16/90344 707/640 |
| 2010/0262617 A1* | 10/2010 | Shinjo | G06F 16/2246 707/769 |
| 2012/0209855 A1* | 8/2012 | Shinjo | G06F 16/322 707/745 |
| 2012/0239664 A1* | 9/2012 | Shinjo | G06F 16/322 707/745 |
| 2015/0006581 A1 | 1/2015 | Luo | |
| 2016/0043999 A1 | 2/2016 | Wongkar et al. | |
| 2018/0026791 A1* | 1/2018 | Bohli | G06F 21/64 713/154 |
| 2018/0267777 A1* | 9/2018 | Shack | G06F 8/38 |

FOREIGN PATENT DOCUMENTS

| | | | |
|---|---|---|---|
| CN | 1609826 A | 4/2005 |
| CN | 103064957 A | 4/2013 |
| CN | 103176866 A | 6/2013 |
| CN | 103620616 A | 3/2014 |
| CN | 105262800 A | 1/2016 |
| CN | 106713493 A | 5/2017 |
| CN | 107451486 A | 12/2017 |

OTHER PUBLICATIONS

Machine Translation and Abstract of Chinese Publication No. CN1605992, Apr. 13, 2005, 12 pages.
Machine Translation and Abstract of Chinese Publication No. CN1609826, Apr. 27, 2005, 12 pages.
Machine Translation and Abstract of Chinese Publication No. CN103064957, Apr. 24, 2013, 24 pages.
Machine Translation and Abstract of Chinese Publication No. CN103176866, Jun. 26, 2013, 8 pages.
Machine Translation and Abstract of Chinese Publication No. CN105262800, Jan. 20, 2016, 11 pages.
Machine Translation and Abstract of Chinese Publication No. CN106713493, May 24, 2017, 10 pages.
Machine Translation and Abstract of Chinese Publication No. CN107451486, Dec. 8, 2017, 41 pages.
Foreign Communication From A Counterpart Application, Chinese Application No. 201710526991.0, Chinese Office Action dated Dec. 26, 2019, 6 pages.
Foreign Communication From A Counterpart Application, Chinese Application No. 201710526991.0, Chinese Search Report dated Dec. 18, 2019, 2 pages.
Foreign Communication From A Counterpart Application, PCT Application No. PCT/CN2018/076743, English Translation of International Search Report dated Apr. 12, 2018, 2 pages.
Foreign Communication From A Counterpart Application, PCT Application No. PCT/CN2018/076743, English Translation of Written Opinion dated Apr. 12, 2018, 4 pages.
Lensing, P., et al., "File System Scalability with Highly Decentralized Metadata on Independent Storage Devices," May 16, 2016, pp. 366-375.

* cited by examiner

FILE SYSTEM PERMISSION SETTING METHOD AND APPARATUS

CROSS-REFERENCE TO RELATED APPLICATION

This application is a continuation of International Patent Application No. PCT/CN2018/076743 filed on Feb. 13, 2018, which claims priority to Chinese Patent Application No. 201710526991.0 filed on Jun. 30, 2017. The disclosures of the aforementioned applications are hereby incorporated by reference in their entireties.

TECHNICAL FIELD

Embodiments of the present disclosure relate to the file system field, and in particular, to a file system permission setting method and apparatus.

BACKGROUND

A file system is a structured data storage and organization form. A file system can be used only after being mounted. An organizational structure of the file system is represented as a tree-like directory tree. The directory tree includes a root directory, a subdirectory, and a file below the subdirectory. The subdirectory may include not only a file but also a lower-level subdirectory. By analogy, a directory tree of a multi-level directory structure is formed. A root of the tree-like structure is a mount point. In the directory tree, the root directory is located on a root node of the directory tree, the file is located on a leaf node of the directory tree, and the subdirectory is located on an intermediate node of the directory tree. Each of the file and the directory is a to-be-accessed object. Before a node that a terminal device or an application program needs to access is accessed, an access control list (ACL) of the to-be-accessed node is queried, and data of the to-be-accessed node is accessed after access permission is obtained. To control access permission of different access devices for different nodes, one ACL is configured for each node in order to separately set access permission for each node. Specifically, an ACL of each node includes several access control entries (ACE). The ACE is used to record an access permission type of the node, and is used to record content such as an access device that accesses the node, and access permission of the access device for the node.

An existing manner of setting an ACL for a node of a directory tree is as follows. After an ACL is set for any node of the directory tree, the ACL is set for all nodes of the directory tree that have same access permission as the node. In this way, the ACL is repeatedly set for each node of the directory tree, and efficiency of setting access permission for the node is relatively low.

SUMMARY

The present disclosure discloses a file system permission setting method and apparatus. According to the file system permission setting method, ACL setting overheads and storage overheads of a node are reduced.

According to a first aspect, a file system permission setting method is provided. The method is applied to a storage system, and includes receiving, by the storage system, a permission setting request, where the permission setting request is used to request to set access permission for a node in a directory tree of a file system, and the permission setting request includes an identifier and a permission record that are of a node to be set with permission, after the storage system receives the permission setting request, obtaining, by the storage system, a currently recorded global version parameter, and updating the currently recorded global version parameter to obtain a latest global version parameter, and storing, by the storage system, the identifier and the permission record that are of the node to be set with permission, and using the latest global version parameter as a permission version number of the node to be set with permission. Global version parameters are set incrementally or decrementally, and each global version parameter represents one permission setting operation on any node of the directory tree. A child node of the node to be set with permission inherits a permission record obtained after a current permission setting operation on the node to be set with permission.

According to the file system permission setting method provided in the present disclosure, a permission record of access permission for the node of the directory tree is quickly set. The updated global version parameter is used to represent one permission setting operation on any node of the directory tree. In this method, the permission record of the child node of the node to be set with permission inherits the permission record obtained after the current permission setting operation on the node to be set with permission. Therefore, only a permission record of a parent node of the directory tree is set, and all files and all subdirectories below a directory corresponding to the parent node inherit the permission record of the parent node such that it is unnecessary to traverse all the subdirectories or files below the parent node to separately set a permission record of each subdirectory or file below the parent node, thereby improving efficiency of setting access permission for the directory tree. The permission record is set for the parent node, and the permission record does not need to be repeatedly set for the subdirectory and the file below the directory corresponding to the parent node, thereby reducing storage space overheads.

Based on the first aspect, in a first implementation, the obtaining a currently recorded global version parameter includes querying a global ACL to obtain the currently recorded global version parameter, where the global ACL is stored in metadata of a root node of the directory tree, and the global ACL stores the global version parameter.

Based on the first implementation of the first aspect, in a second implementation, before the receiving a permission setting request, the method further includes creating, by the storage system, the global ACL, and setting an initial global version parameter for the newly created global ACL.

Based on the first or the second implementation of the first aspect, in a third implementation, the permission setting request further includes path information of the node to be set with permission, the path information of the node to be set with permission indicates all nodes on an access branch from the root node to the node to be set with permission, and the method further includes storing, by the storage system, the path information of the node to be set with permission into the global ACL, where the identifier, the path information, and the permission record that are of the node to be set with permission form a correspondence. Because the identifier, the path information, and the permission record that are of the node to be set with permission form a correspondence, and the correspondence is stored in the global ACL, the identifier, the path information, and the permission record that are of the node to be set with permission in the directory tree can be obtained by indexing only the metadata of the root node of the directory tree. This provides a simple access channel for obtaining the permission record and the path information of the node of the directory tree.

Based on any one of the first aspect or the first to the third implementations of the first aspect, in a fourth implementation, the method further includes receiving, by the storage system, a data access request, where the data access request includes an identifier of a to-be-accessed node, obtaining, by the storage system, access permission for the to-be-accessed node based on the identifier of the to-be-accessed node, where when a permission version number of the to-be-accessed node is not the latest in permission version numbers of all nodes indicated by path information of the to-be-accessed node, the access permission for the to-be-accessed node inherits a permission record corresponding to a parent node that is of the to-be-accessed node and that has a latest permission version number, and performing, by the storage system, authentication based on the access permission for the to-be-accessed node, and accessing data of the to-be-accessed node after the authentication succeeds.

Based on the fourth implementation of the first aspect, in a fifth implementation, when the permission version number of the to-be-accessed node is the latest in the permission version numbers of all the nodes indicated by the path information of the to-be-accessed node, the access permission for the to-be-accessed node is a recorded permission record of the to-be-accessed node.

Based on the fifth implementation of the first aspect, in a sixth implementation, the obtaining access permission for the to-be-accessed node based on the identifier of the to-be-accessed node includes querying, by the storage system, the global ACL, and determining the path information of the to-be-accessed node based on the identifier of the to-be-accessed node, where the path information of the to-be-accessed node is used to indicate the to-be-accessed node and all parent nodes of the to-be-accessed node, querying, by the storage system, the permission version numbers of all the nodes indicated by the path information of the to-be-accessed node, to determine a node with the latest permission version number, and obtaining, by the storage system, a permission record of the node with the latest permission version number, where the permission record of the node with the latest permission version number is the access permission for the to-be-accessed node.

Based on the sixth implementation of the first aspect, in a seventh implementation, the querying the permission version numbers of all the nodes indicated by the path information of the to-be-accessed node, to determine a node with the latest permission version number includes comparing, according to a preset traversal rule, the permission version numbers of all the nodes indicated by the path information of the to-be-accessed node, to determine the node with the latest permission version number. The comparing, according to the preset traversal rule, the permission version numbers of all the nodes indicated by the path information of the to-be-accessed node, to determine the node with the latest permission version number may be presetting the traversal rule based on an access permission distribution rule of the nodes in the directory tree, and determining the node with the latest permission version number by comparing, according to a proper preset traversal rule, permission version numbers of all nodes in a path of the to-be-accessed node, to improve traversal and comparison efficiency.

Based on the seventh implementation of the first aspect, in an eighth implementation, all nodes indicated by path information of each node in the directory tree belong to different directory levels, a directory level of a parent node in all the nodes indicated by the path information of each node in the directory tree is higher than a directory level of a child node that belongs to the parent node, the to-be-accessed node has a lowest directory level, the root node has a highest directory level, and the comparing, according to a preset traversal rule, the permission version numbers of all the nodes indicated by the path information of the to-be-accessed node, to determine the node with the latest permission version number includes selecting and comparing, by the storage system starting from the root node, permission version numbers of two nodes each time from all the nodes indicated by the path information of the to-be-accessed node, to determine a node with a newer permission version number, and determining, until the to-be-accessed node is compared through traversal in descending order of the directory levels, that a node with a newer permission version number is the node with the latest permission version number.

Based on the seventh implementation of the first aspect, in a ninth implementation, all nodes indicated by path information of each node in the directory tree belong to different directory levels, a directory level of a parent node in all the nodes indicated by the path information of each node in the directory tree is higher than a directory level of a child node that belongs to the parent node, the to-be-accessed node has a lowest directory level, the root node has a highest directory level, and the comparing, according to a preset traversal rule, the permission version numbers of all the nodes indicated by the path information of the to-be-accessed node, to determine the node with the latest permission version number includes selecting and comparing, by the storage system starting from the to-be-accessed node, permission version numbers of two nodes each time from all the nodes indicated by the path information of the to-be-accessed node, to determine a node with a newer permission version number, and determining, by the storage system until the root node is compared through traversal in ascending order of the directory levels, that a node with a newer permission version number is the node with the latest permission version number.

Based on any one of the first to the ninth implementations of the first aspect, in a tenth implementation, the method further includes receiving, by the storage system, a node creation request, where the node creation request includes an identifier and path information of a newly added node of the directory tree, and the path information of the newly added node indicates all nodes on an access branch from the root node to the newly added node, storing, by the storage system, a correspondence between the identifier and the path information of the newly added node of the directory tree into the global ACL, and storing, by the storage system, a permission version number of the newly added node into the global ACL, where an initial value of the permission version number of the newly added node is less than or equal to an initial value of the created global version parameter, and setting an initial permission version number for the newly added node, where the initial permission version number that is set for the newly added node is less than or equal to the initial global version parameter. Because the permission version number of the newly added node is less than or equal to the initial value of the global version parameter, a permission version number of a node set with access permission in all nodes indicated by the path information of the newly added node is newer than the permission version number of the newly added node. Therefore, the newly added node inherits access permission for a node with a latest permission version number in all the nodes indicated by the path information of the newly added node. Therefore, when access permission is set for the newly added node, an access record of the access permission for the newly added node does not need to be stored, thereby improving efficiency of setting the access permission for the newly added node, and reducing overheads of storing the access permission for the newly added node.

According to a second aspect, a file system permission setting apparatus is provided. The apparatus includes modules configured to perform the file system permission setting method according to any one of the first aspect or the possible implementations of the first aspect. The modules may be implemented by hardware, or may be implemented by executing corresponding software by hardware. The hardware or software includes one or more modules corresponding to the foregoing function.

According to a third aspect, a file system permission setting apparatus is provided. The apparatus includes a processor and an interface. The interface is configured to receive a request message. The processor is configured to perform the method according to any one of the first aspect or the possible implementations of the first aspect.

The present disclosure provides a file system permission setting method and apparatus. The method is performed by the storage system, and the method is specifically applied to the storage system. The method includes receiving, by the storage system, a permission setting request, where the permission setting request is used to request to set access permission for a node in a directory tree of a file system, and the permission setting request includes an identifier and a permission record that are of a node to be set with permission, after the storage system receives the permission setting request, obtaining, by the storage system, a currently recorded global version parameter, and updating the currently recorded global version parameter to obtain a latest global version parameter, storing, by the storage system, the identifier and the permission record that are of the node to be set with permission, and using the latest global version parameter as a permission version number of the node to be set with permission. Global version parameters are set incrementally or decrementally, and each global version parameter represents one permission setting operation on any node of the directory tree. A child node of the node to be set with permission inherits a permission record obtained after a current permission setting operation on the node to be set with permission. According to the file system permission setting method provided in the present disclosure, a permission record of access permission for the node of the directory tree is quickly set. The updated global version parameter is used to represent one permission setting operation on any node of the directory tree. In this method, the permission record of the child node of the node to be set with permission inherits the permission record obtained after the current permission setting operation on the node to be set with permission. Therefore, only a permission record of a parent node of the directory tree is set, and all files and all subdirectories below a directory corresponding to the parent node inherit the permission record of the parent node such that it is unnecessary to traverse all the subdirectories or files below the parent node to separately set a permission record of each subdirectory or file below the parent node, thereby improving efficiency of setting access permission for the directory tree. The permission record is set for the parent node, and the permission record does not need to be repeatedly set for the subdirectory and the file below the directory corresponding to the parent node, thereby reducing storage space overheads.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following describes technical solutions in embodiments of the present disclosure with reference to accompanying drawings.

Figure 1:
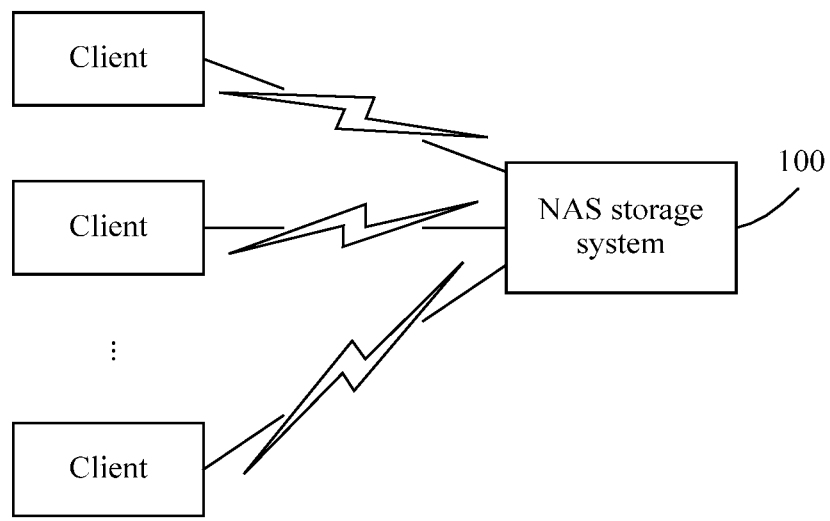
FIG. 1 is a schematic architectural diagram of a storage system according to an embodiment of the present disclosure.

FIG. 1 is a schematic architectural diagram of a storage system according to an embodiment of the present disclosure. The storage system may be a NAS storage system or a storage area network (SAN) storage system. The NAS storage system is used as an example for description in the present disclosure. As shown in FIG. 1, a user communicates with a NAS storage system 100 using a client. The client may be a terminal device or various types of servers. The NAS storage system provides data to the client for access using a network and a file sharing protocol. Used protocols include a transmission control protocol (TCP) for data transmission, the Internet Protocol (IP), and a common internet file (CIFS) protocol and a network file system (NFS) protocol that are used for a network file service.

The terminal device in this embodiment of the present disclosure includes a tablet computer, a notebook computer, a mobile internet device, a palmtop computer, a desktop computer, a mobile phone, or a terminal device in another product form.

The NAS storage system 100 in this embodiment of the present disclosure may be a file server, or may be a storage device such as a computer or a desktop computer.

A directory tree implemented based on a file system includes a root directory, a subdirectory, and a file below the subdirectory, and the root directory or the subdirectory may not only include a file, but also include a lower-level subdirectory. By analogy, a directory tree of a multi-level directory structure is formed.

Based on functions of nodes, nodes in the directory tree include a mounting node, a directory node, and a file node. Based on structures of nodes, the directory tree includes a root node, an intermediate node, and a leaf node. The mounting node is the root node of the directory tree, the directory node is the intermediate node of the directory tree, and the file node is the leaf node of the directory tree. When each node except the root node serves as a child node, the child node has its own parent node. When each node except the leaf node serves as a parent node, the parent node has its own child node. In the directory tree, nodes to which each level of subdirectories and files that are below a directory corresponding to a parent node belong are all child nodes of the parent node.

Path information of each node in the directory tree is used to indicate all nodes on an access branch from the root node of the directory tree to the node. The access branch from the root node to the node is a path from the root node to the node. A location of the node in the directory tree and locations of all the nodes in the path in the directory tree may be identified based on the path from the root node to the node. All subdirectories and files below a directory corresponding to each node in the path separately belong to different directory levels. In a path of each node in the directory tree, a directory level of a directory corresponding to a parent node is higher than directory levels of directories separately corresponding to all child nodes that belong to the parent node. In a path of a to-be-accessed node, a directory corresponding to the to-be-accessed node has a lowest directory level, and a directory corresponding to a root node has a highest directory level.

Figure 2:
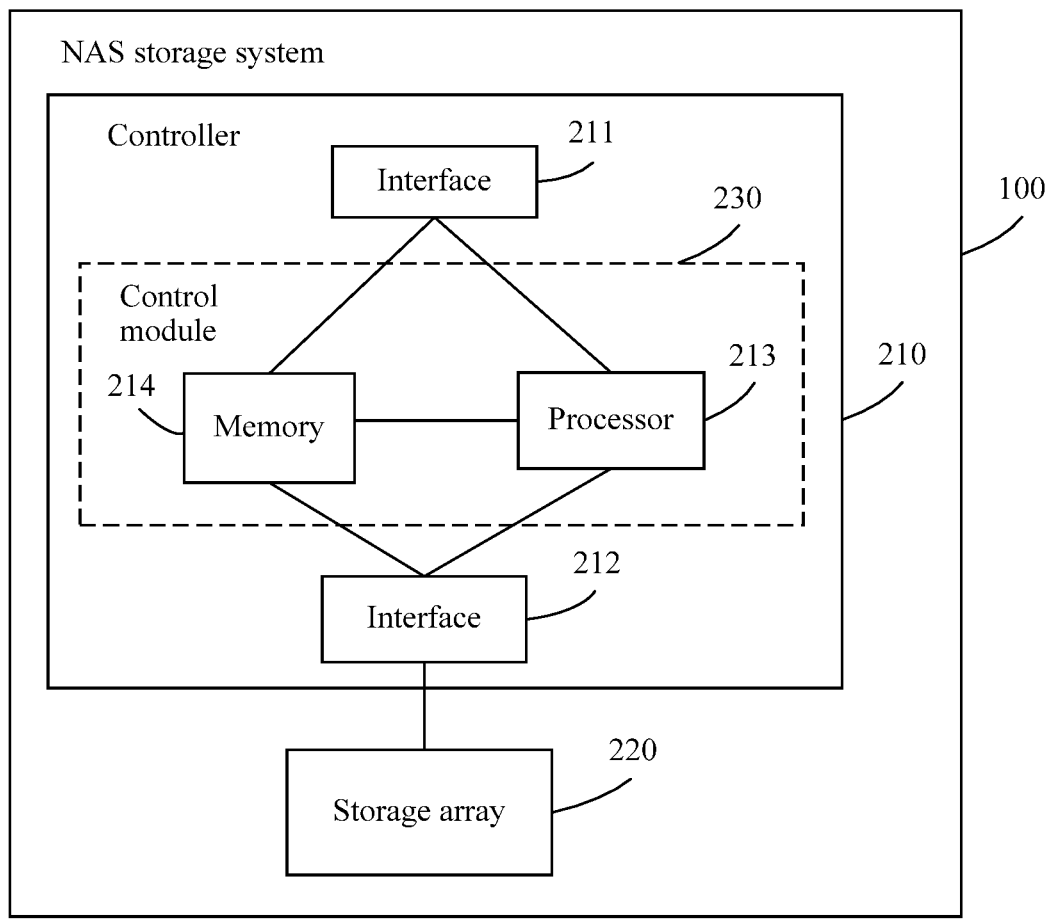
FIG. 2 is a schematic structural diagram of a network-attached storage (NAS) storage system 100 according to an embodiment of the present disclosure.

FIG. 2 is a schematic structural diagram of a NAS storage system 100 according to an embodiment of the present disclosure. The NAS storage system 100 is used for storage and includes a controller 210 and a storage array 220.

The controller 210 is configured to receive a data access request from a client, perform authentication based on the received access request, determine location information of to-be-accessed data in the storage array 220 after the authentication succeeds, and initiate access to data in the storage array 220.

The controller 210 is further configured to set access permission for a node in a directory tree. When the access permission is being set, a permission record is stored, and the permission record describes access permission of the client for the node. The permission record includes an ACE, and the ACE records content such as an access permission type of a node, an object that can access the node, and access permission that is of the object that can access the node and that is for the node.

The storage array 220 is configured to store data. The controller 210 performs authentication on the to-be-accessed request. After the authentication succeeds, the controller 210 accesses data of a to-be-accessed node.

The storage array 220 is further configured to store metadata of the data. The metadata describes the stored data, and includes standard attribute data, extended attribute data, and layout attribute data. The standard attribute data is used to describe standard attributes such as a size and a modification time of the data. The layout attribute data is used to describe a storage location of the data. The extended attribute data includes data describing access permission for a node.

In an existing solution, ACL permission is set by traversing all nodes included in a directory tree. This permission setting mechanism consumes a long time, affecting service processing efficiency. In addition, a root directory, a subdirectory, and a file that are included in the directory tree record an identical ACL, thereby wasting storage space. In an embodiment of the present disclosure, for the disadvantage in the other approaches, when a file and a subdirectory that are included in a directory tree have identical ACL permission, the following solution is proposed.

The present disclosure provides a method for quickly setting ACL permission for a directory tree. In this method, only ACL permission for a parent node of the directory tree is set, and all files and all subdirectories below a directory corresponding to the parent node inherit the ACL permission for the parent node. Because all the files and all the subdirectories below the directory corresponding to the parent node inherit the ACL permission for the parent node, only the ACL permission for the parent node needs to be set, and it is unnecessary to traverse all the subdirectories or files below the parent node to separately set ACL permission for each subdirectory or file below the parent node, thereby improving efficiency of setting the ACL permission for the directory tree. The ACL permission is set for the parent node, and the ACL permission does not need to be repeatedly set for the subdirectory and the file below the directory corresponding to the parent node, thereby reducing storage space overheads.

According to the method for quickly setting ACL permission for a directory tree provided in the present disclosure, all the files and all the subdirectories below the directory corresponding to the parent node inherit the ACL permission for the parent node. Therefore, when any file or subdirectory below the directory corresponding to the parent node is being accessed, only all nodes in a path from a to-be-accessed file or subdirectory to a root node need to be queried to search for a parent node with latest ACL permission. Because ACL permission for the to-be-accessed file or subdirectory inherits the ACL permission for the parent node with the latest ACL permission, the latest ACL permission for the parent node with the latest ACL permission may be used as an ACL permission of the to-be-accessed file or subdirectory.

According to the method for quickly setting ACL permission for a directory tree provided in the present disclosure, a global ACL is set. The global ACL may be stored in metadata of a root node of the directory tree. The global ACL is used to store permission information of each node into the directory tree. In an embodiment, a permission record of any node in the directory tree is no longer independently stored in metadata of the node itself, but is collectively stored in the global ACL. In addition, the global ACL stores a global version parameter, and in the global ACL, a value of the updated global version parameter is used to indicate a permission version number of a node to be set with permission. According to the method for quickly setting ACL permission for a directory tree provided in the present disclosure, after receiving a permission setting request, the NAS storage system 100 queries the global ACL using the controller 210, to obtain the global version parameter, updates the global version parameter to obtain a current global version parameter, stores an identifier and a permission record that are of the node to be set with permission, and uses the current global version parameter as the permission version number of the node to be set with permission. The permission setting request is used to request to set access permission for a node in a directory tree of a file system, and the permission setting request includes the identifier and the permission record that are of the node to be set with permission.

As shown in FIG. 2, the controller 210 includes an interface 211 and an interface 212, and the interface 211 is configured to communicate with the client. The interface 212 is configured to communicate with the storage array 220. The controller 210 further includes a control module 230. The control module 230 is configured to set access permission for the node in the directory tree, and is configured to perform authentication on a permission record of the to-be-accessed node. The control module 230 performs authentication on the permission record of the to-be-accessed node. After the authentication succeeds, the control module 230 accesses the data of the to-be-accessed node.

As shown in FIG. 2, the control module 230 includes a processor 213 and a memory 214. The processor 213 is configured to set the access permission for the node in the directory tree, and is configured to perform authentication on the permission record of the to-be-accessed node. The processor 213 performs authentication on the permission record of the to-be-accessed node. After the authentication succeeds, the processor 213 accesses the data of the to-be-accessed node.

The memory 214 includes a high-speed random access memory (RAM), and may further include a nonvolatile memory (NVM), for example, at least one disk memory. It may be understood that the memory 214 may be a machine readable medium capable of storing program code, for example, a RAM, a magnetic disk, a hard disk, a solid state disk (SSD), or a NVM.

The memory 214 is configured to temporarily store information sent from the client.

The processor 213 may be any computing device, may be a general-purpose central processing unit (CPU), a microprocessor, a programmable controller, an application-specific integrated circuit (ASIC), or one or more integrated circuits for controlling execution of the foregoing solution program.

The following describes in detail a function of each part of the NAS storage system 100 in the present disclosure using a structure of the NAS storage system 100 shown in FIG. 2.

In the present disclosure, the interface 211 is configured to receive a permission setting request sent by a client. The permission setting request is used to request to set access permission for a node to be set with access permission in a directory tree of a file system.

The permission setting request includes an identifier and a permission record that are of the node to be set with access permission in the directory tree. The permission setting request is used to instruct the processor 213 to update a currently recorded global version parameter to obtain a latest global version parameter.

In the present disclosure, the processor 213 is configured to set, based on the permission setting request, access permission for the node to be set with permission. The processor 213 is configured to obtain the currently recorded global version parameter, and update the currently recorded global version parameter to obtain the latest global version parameter. Global version parameters are set incrementally or decrementally, and each global version parameter represents one permission setting operation on any node of the directory tree. The processor 213 is further configured to store the identifier and the permission record that are of the node to be set with permission, and use the latest global version parameter as a permission version number of the node to be set with permission. Permission records of all child nodes of the node to be set with permission inherit a permission record obtained after a current permission setting operation on the node to be set with permission.

When the node to be set with permission serves as a parent node, after the access permission is set for the node to be set with permission, all files and all subdirectories below a directory corresponding to the node to be set with permission inherit the access permission for the node to be set with permission. Because all the files and all the subdirectories below the directory corresponding to the parent node inherit ACL permission for the parent node, only the ACL permission for the node to be set with permission needs to be set, and it is unnecessary to traverse all the subdirectories or files below the parent node to separately set ACL permission for each subdirectory or file below the parent node, to avoid repeatedly setting the access permission for all other child nodes that have same access permission as the node to be set with permission, thereby improving efficiency of setting ACL permission for the directory tree. In this implementation, if a value is used to represent a value of the global version parameter, a larger value indicates newer access permission.

In addition, in the present disclosure, the access permission does not need to be repeatedly set for all the child nodes below the parent node that have the same access permission as the parent node, thereby reducing overheads of storing access permission data.

In the present disclosure, the permission setting request may further include path information of the node to be set with permission, and the path information of the node to be set with permission indicates all nodes on an access branch from the root node to the node to be set with permission. In the present disclosure, a global ACL is set to store a correspondence among an identifier, path information, and a permission record that are of a node set with access permission. The global ACL further includes the global version parameter. The global ACL is stored in metadata of the root node of the directory tree. After the access permission is set for the node, the latest global version parameter is used as the permission version number of the node to be set with permission. Therefore, the global ACL may also store a permission version number of a node set with access permission.

In the present disclosure, the interface 211 is further configured to receive a global ACL creation request sent by the client. The global ACL creation request is used to instruct the processor 213 to create the global ACL and set an initial global version parameter for the newly created global ACL.

The processor 213 is configured to create the global ACL based on the global ACL creation request. The created global ACL stores the global version parameter. A value of the global version parameter in the created global ACL is an initial value, and the initial value of the global version parameter is 0, or may be another value or letter or another symbol identifier.

Figure 3:
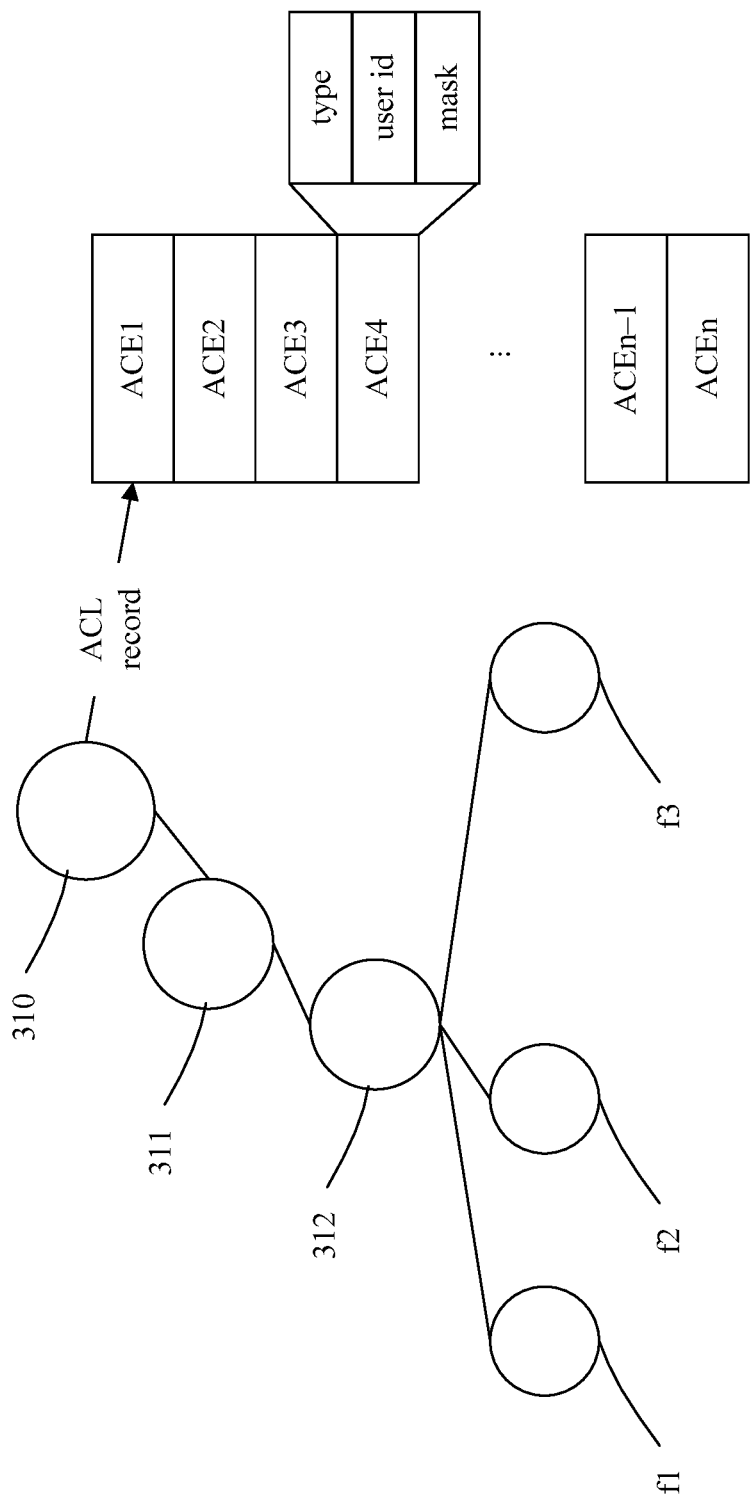
FIG. 3 is a schematic diagram of an organization form of a directory tree according to an embodiment of the present disclosure.

FIG. 3 is a schematic diagram of an organization form of a directory tree according to an embodiment of the present disclosure. As shown in FIG. 3, the directory tree includes a root node 310, an intermediate node 311, an intermediate node 312, a leaf node f1, a leaf node f2, and a leaf node f3.

After a global ACL is created and before access permission is set for a node to be set with permission, the created global ACL may be shown in Table 1. The global ACL shown in Table 1 includes a global version parameter, and a value of an initial global version parameter set for the newly created global ACL is 0 shown in Table 1. The global ACL shown in Table 1 is further used to store an identifier of each node and path information of each node of a directory tree of a file system.

If a path of a node is determined using identifiers of all nodes in the path of the node, path information of the node includes the identifier of each node in the file system. For example, each node is identified using a number, and an identifier of a root node shown in Table 1 is a number 310. Therefore, path information of the root node 310 includes the number 310 in the identifier of the root node. In an embodiment, a correspondence among the global version parameter in the created global ACL, the identifier of each node in the file system, and the path information of each node is shown in Table 1. As shown in Table 1, the global ACL may be further used to store a permission record and a permission version number that are of a node to be set with ACL permission. After the global ACL is created, if no ACL permission is set for the node of the directory tree, the permission record and the permission version number stored in the global ACL are empty.

TABLE 1

| Global version parameter | Identifier of a node | Path information | Permission version number | Permission record |
|---|---|---|---|---|
| 0 | Root node 310 | \310 | | |
| | Intermediate node 311 | \310\311 | | |
| | Intermediate node 312 | \310\311\312 | | |
| | Leaf node f1 | \310\311\312\f1 | | |
| | Leaf node f2 | \310\311\312\f2 | | |
| | Leaf node f3 | \310\311\312\f3 | | |

If the path of each node is unique, the node may be identified using the path information of the node. Therefore, the correspondence among the global version parameter, the identifier of each node in the file system, and the path information of each node may be shown in Table 2.

TABLE 2

| Global version parameter | Identifier of a node | Permission version number | Permission record |
|---|---|---|---|
| 0 | \310 | | |
| | \310\311 | | |
| | \310\311\312 | | |
| | \310\311\312\f1 | | |
| | \310\311\312\f2 | | |
| | \310\311\312\f3 | | |

After the global ACL is created, the user sets access permission for a node in the directory tree using the client.

The processor 213 is further configured to store the identifier and the permission record that are of the node to be set with permission into the global ACL. The permission version number of the node to be set with permission is a value of the updated global version parameter.

The processor 213 is further configured to obtain access permission for a to-be-accessed node before accessing data of the to-be-accessed node. The access permission for the to-be-accessed node is access permission for a node with a latest permission version number in all nodes indicated by information about a path from the to-be-accessed node to the root node. The access permission for the node with the latest permission version number is indicated by a permission record of the node with the latest permission version number. The access permission for the to-be-accessed node is represented by the permission record corresponding to the node with the latest permission version number in all the nodes indicated by the path information of the to-be-accessed node.

In the present disclosure, the storage system organizes access permission data of all nodes of the directory tree using the global ACL. The global ACL stored in the storage array 220 is used to describe the access permission for the node to be set with permission. Specifically, the global ACL is used to store the value of the updated global version parameter, and is used to store a correspondence among the identifier, the path information, and the permission record that are of the node to be set with permission. The permission version number of the node to be set with permission is the value of the updated global version parameter. Because the identifier, the path information, and the permission record that are of the node to be set with permission form a correspondence, and the correspondence is stored in the global ACL, the identifier, the path information, and the permission record that are of the node to be set with permission in the directory tree can be obtained by indexing only the metadata of the root node of the directory tree. This provides a simple access channel for obtaining the permission record and the path information of the node of the directory tree.

Figure 4:
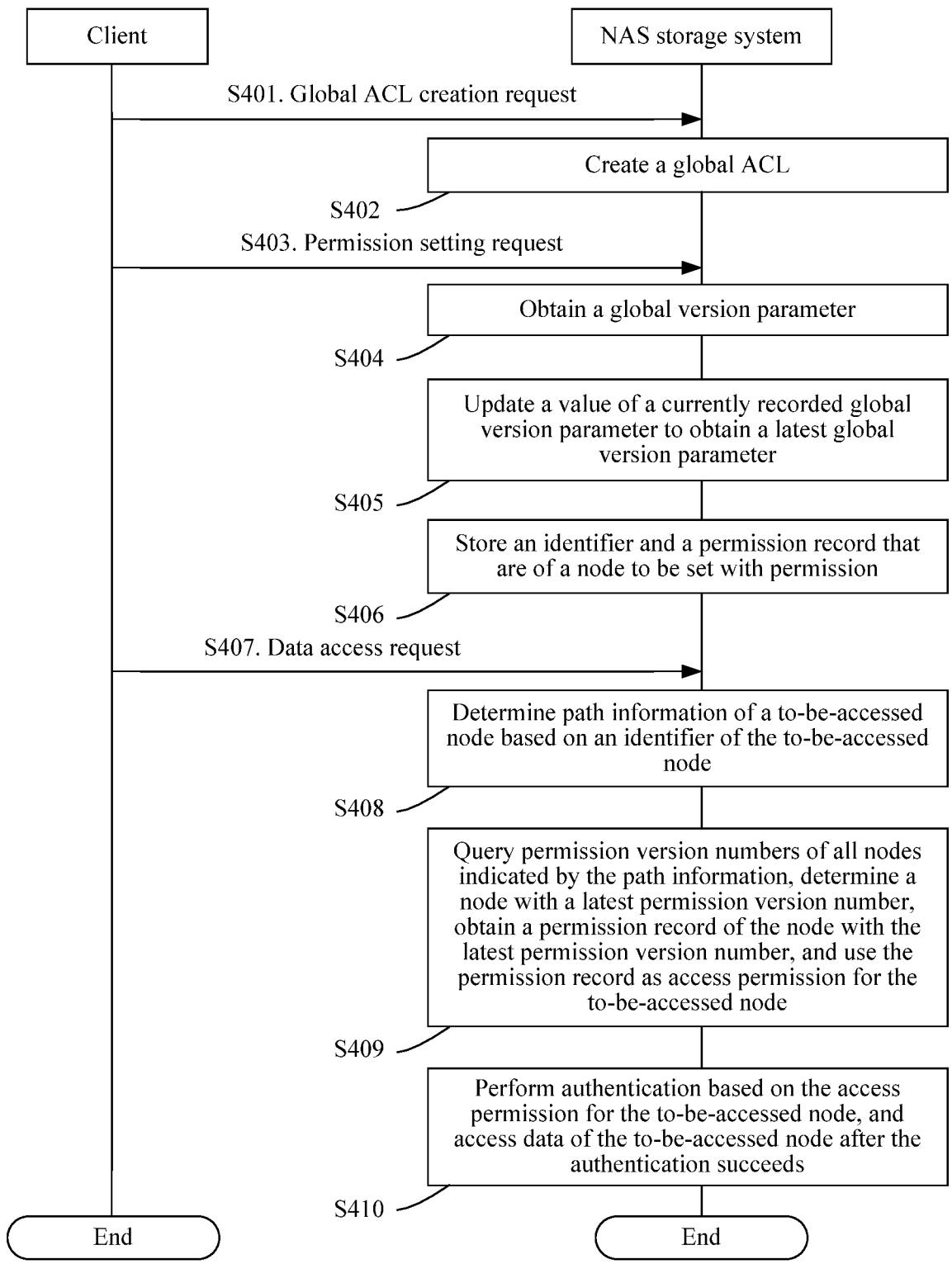
FIG. 4 is a flowchart of a data access method according to an embodiment of the present disclosure.

FIG. 4 is a flowchart of a data access method according to an embodiment of the present disclosure. As shown in FIG. 4, the data access method provided in this embodiment is performed by the NAS storage system 100 shown in FIG. 2, and may be specifically performed by the control module 230 in the NAS storage system 100 or the processor 213 in the control module 230 shown in FIG. 2. A method of setting, after a directory tree is created, access permission for the created directory tree and then accessing data of a to-be-accessed node in the created directory tree is described in detail, and further includes the following steps.

S401. The NAS storage system 100 receives a global ACL creation request sent by a client.

In the present disclosure, the global ACL creation request is used to instruct the NAS storage system 100 to create a global ACL.

A user may send the global ACL creation request to the NAS storage system 100 using the client. The global ACL creation request includes an identifier of a root node of a directory tree.

Based on the foregoing implementation of the global ACL creation request, in another implementation, the global ACL creation request may include path information of each node of the directory tree and an identifier of each node. The path information of each node indicates all nodes on an access branch from the root node to the node, that is, is used to indicate a path from the root node to the node. According to the path, a location of the node in the directory tree and a location of an intermediate node in the path in the directory tree may be found. Each node except the root node in the path belongs to one parent node, each node except a leaf node in the path has a child node of the node itself, and subdirectories and files below a directory corresponding to each node except a leaf node belong to different directory levels.

If an identifier of each node in the path is used to represent path information of the node, the global ACL creation request may include only the path information of each node of the directory tree.

S402. The NAS storage system 100 creates a global ACL. In an embodiment, the NAS storage system 100 creates a global version parameter, and stores the global version parameter into the global ACL, where a value of the global version parameter is an initial value.

In an optional implementation, based on the implementation, described in step S401, in which the global ACL creation request may include the path information of each node of the directory tree and the identifier of each node, the NAS storage system 100 stores a correspondence between the path information of each node of the directory tree and the identifier of the node into the global ACL. A global ACL shown in Table 3 includes the correspondence between the path information of each node of the directory tree and the identifier of the node. The global ACL shown in Table 3 further includes a global version parameter. Based on the directory tree shown in FIG. 3, content of the global ACL created in this step is executed as shown in Table 3.

TABLE 3

| Global version parameter | Identifier of a node | Path information | Permission version number | Permission record |
|---|---|---|---|---|
| 0 | Root node 310 | \310 | | |
| | Intermediate node 311 | \310\311 | | |
| | Intermediate node 312 | \310\311\312 | | |
| | Leaf node f1 | \310\311\312\f1 | | |
| | Leaf node f2 | \310\311\312\f2 | | |
| | Leaf node f3 | \310\311\312\f3 | | |

If an identifier of each node in the path is used to represent path information of the node, the global ACL includes the global version parameter and the path information of each node.

S403. The NAS storage system 100 receives a permission setting request. The permission setting request is used to request to set access permission for a node in a directory tree of a file system, and the permission setting request includes an identifier and a permission record that are of a node to be set with permission.

In an embodiment, the user sends the permission setting request using the client.

The permission setting request includes the identifier and the permission record that are of the node to be set with permission. Based on the directory tree shown in FIG. 3, for example, the intermediate node 311 is the node to be set with permission. As shown in FIG. 3, the permission record includes several ACEs, and each ACE includes content such as a control type (type), permission (mask), and a user identifier. The control type includes allowed, denied, and the like. The user identifier indicates a user or a type of users. The permission (mask) indicates access permission of a corresponding user, and is usually represented in a mask manner.

Based on the implementation in step S401, the newly created global ACL includes the path information of each node of the directory tree and the identifier of each node if the global ACL creation request received by the NAS storage system 100 includes the path information of each node of the directory tree and the identifier of each node. Therefore, after receiving the permission setting request, the NAS storage system 100 stores the permission record of the node to be set with permission into the global ACL. The identifier, path information, and the permission record that are of the node to be set with permission form a correspondence.

Based on the implementation in step S401, the newly created global ACL does not include the path information of each node of the directory tree and the identifier of each node if the global ACL creation request received by the NAS storage system 100 does not include the path information of each node of the directory tree and the identifier of each node. Therefore, an optional implementation of the permission setting request in step S403 of the present disclosure is that the permission setting request includes not only the identifier and the permission record of the node to be set with permission but also the path information of the node to be set with permission, and the path information of the node to be set with permission indicates all nodes on an access branch from the root node to the node to be set with permission. Therefore, after receiving the permission setting request, the NAS storage system 100 stores the path information of the node to be set with permission into the global ACL. The identifier, the path information, and the permission record that are of the node to be set with permission form a correspondence.

Based on the implementation in step S401, the newly created global ACL does not include the path information of each node of the directory tree and the identifier of each node if the global ACL creation request received by the NAS storage system 100 does not include the path information of each node of the directory tree and the identifier of each node. Therefore, in an optional implementation, the correspondence among the identifier, the path information, and the permission record that are of the node to be set with permission is stored in metadata of the node to be set with permission.

S404. The NAS storage system 100 obtains the global version parameter.

In an embodiment, the NAS storage system 100 may query the global ACL to obtain a currently recorded global version parameter.

The global ACL is stored in metadata of the root node of the directory tree, and the global ACL stores the global version parameter. Based on content of the global ACL of the directory tree shown in Table 3, it is determined, based on content of the global ACL created by the NAS storage system 100 in step S402, that a value of the created global version parameter is 0.

S405. The NAS storage system 100 updates a value of the currently recorded global version parameter to obtain a latest global version parameter. The latest global version parameter is used as a permission version number of the node to be set with permission.

In the present disclosure, the permission version number of the node to be set with permission may be stored in the global ACL. In another implementation, the permission version number of the node to be set with permission may alternatively be stored in the metadata of the node to be set with permission.

Global version parameters are set incrementally or decrementally, and each global version parameter represents one permission setting operation on any node of the directory tree. The NAS storage system 100 updates the value of the global version parameter. In an embodiment, the NAS storage system 100 may increase or decrease the value of the global version parameter based on a preset granularity. The preset granularity may be 1, or may be another value greater than zero. Further, in this implementation, after the NAS storage system 100 increases the value of the global version parameter by 2, an obtained value of the global version parameter is 2.

S406. The NAS storage system 100 stores the identifier and the permission record that are of the node to be set with permission. The permission version number of the node to be set with permission is the value of the updated latest global version parameter. A child node of the node to be set with permission inherits a permission record obtained after a current permission setting operation on the node to be set with permission.

The identifier and the permission record of the node to be set with permission are stored in the global ACL. In another implementation, the identifier and the permission record of the node to be set with permission may alternatively be stored in the metadata of the node to be set with permission.

The permission version number of the node to be set with permission is stored in the global ACL. In another implementation, the permission version number of the node to be set with permission may alternatively be stored in the metadata of the node to be set with permission.

In this implementation, the specified global ACL includes the value of the updated global version parameter, and the identifier, the permission version number, and the permission record that are of the node to be set with permission. For example, after the global ACL is set, the content of the global ACL is shown in Table 4. The specified global ACL includes a value (2) of the updated global version parameter, and a permission version number (2) and the permission record (ACE1, ACE2, . . . , and ACEn) that are of the node to be set with permission.

TABLE 4

| Global version parameter | Identifier of a node | Path information | Permission version number | Permission record |
|---|---|---|---|---|
| 2 | Root node 310 | \310 | | |
| | Intermediate node 311 | \310\311 | 2 | ACE1, ACE2, . . . , and ACEn |
| | Intermediate node 312 | \310\311\312 | | |
| | Leaf node f1 | \310\311\312\f1 | | |
| | Leaf node f2 | \310\311\312\f2 | | |
| | Leaf node f3 | \310\311\312\f3 | | |

The present disclosure provides a method for quickly setting ACL permission for a directory tree. In this method, only ACL permission for a parent node of the directory tree is set. For example, ACL permission for the intermediate node 311 in Table 4 is set. Therefore, all files and all subdirectories below a directory corresponding to the parent node such as the intermediate node 311 shown in Table 4, for example, a subdirectory corresponding to the intermediate node 312 shown in Table 4 and files corresponding to the leaf node f1, the leaf node f2, and the leaf node f3, inherit the ACL permission for the parent node (the intermediate node 311 shown in Table 4). Because all the files and all the subdirectories below the directory corresponding to the parent node inherit the ACL permission for the parent node, only the ACL permission for the parent node needs to be set, and it is unnecessary to traverse all the subdirectories or files below the parent node to separately set ACL permission for each subdirectory or file below the parent node, thereby improving efficiency of setting the ACL permission for the directory tree. The ACL permission is set for the parent node, and the ACL permission does not need to be repeatedly set for the subdirectory and the file below the directory corresponding to the parent node, thereby reducing storage space overheads.

S407. The NAS storage system 100 receives a data access request.

The user sends the data access request using the client. The data access request is used to instruct to access data of a to-be-accessed node in the directory tree, and the data access request includes an identifier of the to-be-accessed node in the directory tree. The data requested for access belongs to the to-be-accessed node, and the to-be-accessed node is any node of the created directory tree. A permission record is set for all or some nodes in the directory tree. In the present disclosure, a permission version number of a node not set with a permission record is considered as a smallest version number by default.

S408. The NAS storage system 100 determines path information of the to-be-accessed node based on an identifier of the to-be-accessed node.

In an embodiment, the NAS storage system 100 queries the global ACL or metadata of the to-be-accessed node, and determines the path information of the to-be-accessed node based on the identifier of the to-be-accessed node. The path information of the to-be-accessed node is used to indicate the to-be-accessed node and all parent nodes of the to-be-accessed node.

Before the user accesses data, the global ACL needs to be queried, to obtain access permission for the to-be-accessed node to which the data belongs.

S409. The NAS storage system 100 queries the permission version numbers of all the nodes indicated by the path information, determines a node with a latest permission version number, obtains a permission record of the node with the latest permission version number, and uses the permission record as access permission for the to-be-accessed node.

The permission record, obtained by the NAS storage system 100, of the node with the latest permission version number is the access permission for the to-be-accessed node. When the permission version number of the to-be-accessed node is the latest in permission version numbers of the to-be-accessed node and all the parent nodes of the to-be-accessed node, the access permission for the to-be-accessed node is a recorded permission record of the to-be-accessed node. When the permission version number of the to-be-accessed node is not the latest in the permission version numbers of the to-be-accessed node and all the parent nodes of the to-be-accessed node, the access permission for the to-be-accessed node inherits a permission record corresponding to a parent node that is of the to-be-accessed node and that has a latest permission version number.

Specifically, in the present disclosure, if the permission version number is represented by a number, the NAS storage system 100 queries the permission version numbers of all the nodes in the path, to determine that a node with a largest permission version number is the node with the latest permission version number.

Before the user accesses data, the user needs to obtain access permission for a node to which the data belongs, to obtain access permission for the data.

In the present disclosure, access permission is set for all or some nodes in the directory tree, and access permission for a node is described using a permission record.

In this step, the querying the permission version numbers of all the nodes indicated by the path information of the to-be-accessed node, to determine a node with a latest permission version number further includes comparing, by the NAS storage system 100 according to a preset traversal rule, the permission version numbers of all the nodes indicated by the path information of the to-be-accessed node, to determine the node with the latest permission version number.

In the present disclosure, all nodes indicated by path information of each node in the directory tree belong to different directory levels. A directory level of a parent node in all the nodes indicated by the path information of each node in the directory tree is higher than a directory level of a child node that belongs to the parent node. In all the nodes indicated by the path information of the to-be-accessed node, the to-be-accessed node has a lowest directory level, and the root node has a highest directory level.

One case in which the NAS storage system 100 compares, according to the preset traversal rule, the permission version numbers of all the nodes indicated by the path information of the to-be-accessed node, to determine the node with the latest permission version number is selecting and comparing, starting from the root node, permission version numbers of two nodes each time from all the nodes indicated by the path information of the to-be-accessed node, to determine a node with a newer permission version number, and determining, until the to-be-accessed node in all the nodes indicated by the path information of the to-be-accessed node is compared through traversal in descending order of the directory levels, that a node with a newer permission version number is the node with the latest permission version number.

The selecting and comparing, starting from the root node, permission version numbers of two nodes each time from all the nodes indicated by the path information of the to-be-accessed node, to determine a node with a newer permission version number is further selecting, in descending order of the directory levels starting from the root node, one current node from all the nodes indicated by the path information of the to-be-accessed node, selecting, each time from all the nodes indicated by the path information of the to-be-accessed node, one to-be-compared node that is one level lower than a directory level of the current node, and comparing a permission version number of the current node and a permission version number of the to-be-compared node, to determine a node with a newer permission version number. The determining, until the to-be-accessed node in all the nodes indicated by the path information of the to-be-accessed node is compared through traversal in descending order of the directory levels, that a node with a newer permission version number is the node with the newer permission version number is further continuing using the current node as a current node when the permission version number of the current node is the latest permission version number, selecting, as a new to-be-compared node from all the nodes indicated by the path information of the to-be-accessed node, one node that is one level lower than a directory level of the current node, and comparing the permission version number of the current node and a permission version number of the new to-be-compared node. When the permission version number of the to-be-compared node is the latest permission version number, the to-be-compared node is selected as a new current node, one node that is one level lower than the directory level of the new current node is selected as a new to-be-compared node from all the nodes indicated by the path information of the to-be-accessed node, permission version numbers are compared, and a current node that is determined until the permission version number of the to-be-accessed node of the directory tree is compared is the node with the latest permission version number.

If the permission version number of the current node is the same as the permission version number of the to-be-compared node, the current node is used as a node with a newer permission version number in the current node and the to-be-compared node, the current node continues being used as a current node, one node that is one level lower than the directory level of the current node is selected as a new to-be-compared node from all the nodes indicated by the path information of the to-be-accessed node, the permission version number of the current node is compared with a permission version number of the new to-be-compared node, and a current node that is determined until the permission version number of the to-be-accessed node of the directory tree is compared is the node with the latest permission version number.

Another case in which the NAS storage system 100 compares, according to the preset traversal rule, the permission version numbers of all the nodes indicated by the path information of the to-be-accessed node, to determine the node with the latest permission version number is selecting and comparing, starting from the to-be-accessed node, permission version numbers of two nodes each time from all the nodes indicated by the path information of the to-be-accessed node, to determine a node with a newer permission version number, and determining, until the root node in all the nodes indicated by the path information of the to-be-accessed node is compared through traversal in ascending order of the directory levels, that a node with a newer permission version number is the node with the latest permission version number.

The selecting and comparing, starting from the to-be-accessed node, permission version numbers of two nodes each time from all the nodes indicated by the path information of the to-be-accessed node, to determine a node with a newer permission version number is further selecting, in ascending order of the directory levels starting from the to-be-accessed node, one current node from all the nodes indicated by the path information of the to-be-accessed node, selecting, each time from all the nodes indicated by the path information of the to-be-accessed node, one to-be-compared node that is one level higher than a directory level of the current node, and comparing a permission version number of the current node and a permission version number of the to-be-compared node, to determine a node with a newer permission version number. The determining, until the root node in all the nodes indicated by the path information of the to-be-accessed node is compared through traversal in ascending order of the directory levels, that a node with a newer permission version number is the node with the latest permission version number is further continuing using the current node as a current node when the permission version number of the current node is the latest permission version number, selecting, as a new to-be-compared node from all the nodes indicated by the path information of the to-be-accessed node, one node that is one level higher than a directory level of the to-be-compared node, and comparing the permission version number of the current node and a permission version number of the new to-be-compared node. When the permission version number of the to-be-compared node is a node with a newer permission version number, the to-be-compared node is selected as a new current node, one node that is one level higher than a directory level of the new current node is selected as a new to-be-compared node from all the nodes indicated by the path information of the to-be-accessed node, permission version numbers are compared, and a current node that is determined until a permission version number of the root node of the directory tree is compared is the node with the latest permission version number.

If the permission version number of the current node is the same as the permission version number of the to-be-compared node, the current node is used as a node with a newer permission version number in the current node and the to-be-compared node, the current node continues being used as a current node, one node that is one level higher than the directory level of the current node is selected as a new to-be-compared node from all the nodes indicated by the path information of the to-be-accessed node, the permission version number of the current node is compared with a permission version number of the new to-be-compared node, and a current node that is determined until the permission version number of the root node of the directory tree is compared is the node with the latest permission version number.

S410. The NAS storage system 100 performs authentication based on the access permission for the to-be-accessed node, and the client accesses data of the to-be-accessed node after the authentication succeeds. The access permission for the to-be-accessed node is access permission for a node with a latest permission version number in all nodes indicated by information about a path from the to-be-accessed node to the root node.

In this implementation, because all the files and all the subdirectories below the directory corresponding to the parent node inherit the ACL permission for the parent node, when any file or subdirectory below the directory corresponding to the parent node is being accessed, only all nodes in path from the to-be-accessed file or subdirectory to the root node need to be queried to search for a parent node with latest ACL permission. For example, when the intermediate node 312 shown in Table 4 is being accessed, because ACL permission for a subdirectory corresponding to the intermediate node 312 inherits ACL permission for a parent node with latest ACL permission, that is, the intermediate node 311 serves as a parent node of the intermediate node 312, the intermediate node 312 has latest ACL permission, and therefore, the latest ACL permission for the parent node with the latest ACL permission may be used as an ACL permission of the to-be-accessed file or subdirectory.

In an optional implementation, in the foregoing implementation shown in FIG. 4, after step S409, that is, after the NAS storage system 100 queries the permission version numbers of all the nodes indicated by the path information, and determines the node with the latest permission version number and the permission record of the node with the latest permission version number, the NAS storage system 100 may store a permission version number and the permission record of the to-be-accessed node into the global ACL. An permission version number of the to-be-accessed node is the latest permission version number determined in step S409, and the permission record of the to-be-accessed node is the permission record of the node with the latest permission version number determined in step S409.

In the present disclosure, the NAS storage system 100 separately configures a global ACL identifier for a plurality of directory trees including different root nodes. The global ACL identifier includes an identifier of a root node of a directory tree, and the plurality of directory trees including different root nodes are distinguished using identifiers of the different root nodes. Therefore, different global ACLs corresponding to the plurality of directory trees including different root nodes may be distinguished using the identifiers of the root nodes of directory trees.

In another implementation of configuring the global ACL identifier, the global ACL identifier may alternatively be a combination of an identifier of a root node of a directory tree and global ACL version information. The global ACL version information is used to identify a plurality of global ACL versions of a directory tree including a root node. After a child node is added to or is removed from the directory tree, the NAS storage system 100 backs up a global ACL of the directory tree that exists before the change. Therefore, the file system has a plurality of versions corresponding to a plurality of directory trees including a same root node, and the plurality of versions corresponding to the plurality of directory trees including the same root node include a global ACL version that exists before a node is added to the directory tree, or an updated global ACL version that exists after a node is added to the directory tree, or a global ACL version that exists before a node is removed from the directory tree, or an updated global ACL version that exists after a node is removed from the directory tree, or at least one global ACL version that is backed up for a same directory tree at different times. In the present disclosure, a plurality of global ACL versions are backed up for ease of subsequent recovery of the global ACL.

Figure 5:
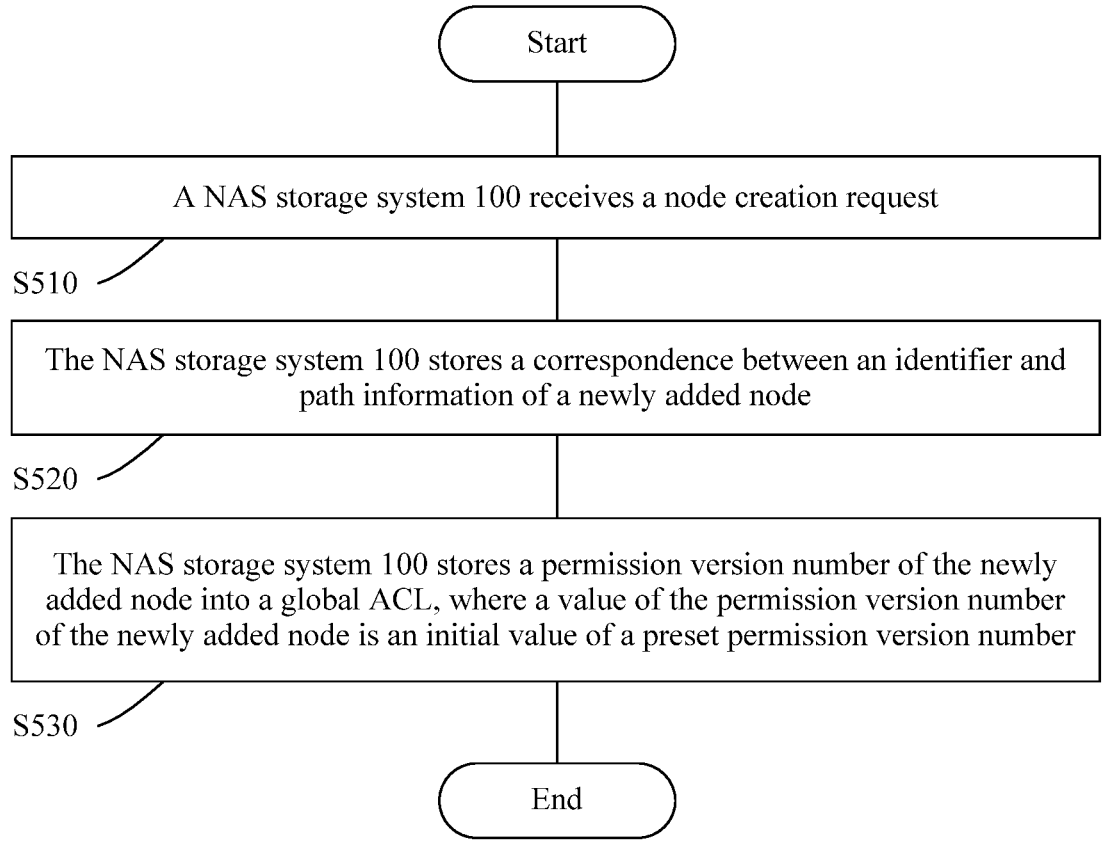
FIG. 5 is a flowchart of a method for setting access permission for a newly added node according to an embodiment of the present disclosure.

Based on the embodiment shown in FIG. 4, after step S402, that is, after the global ACL is created or the directory tree is created, when the user needs to change a directory tree with a created ACL or a directory tree without a created global ACL, for example, when a new directory node or a file node needs to be added to the directory tree, the present disclosure provides a method for setting access permission, to set access permission for a newly added directory node or file node. The following describes in detail a method for setting access permission for a node newly added to an existing directory tree. FIG. 5 is a flowchart of a method for setting access permission for a newly added node according to an embodiment of the present disclosure. As shown in FIG. 5, the method for setting access permission for a newly added node provided in this embodiment is performed by the NAS storage system 100 shown in FIG. 2, may be further performed by the control module 230 in the NAS storage system 100 or the processor 213 in the control module 230 shown in FIG. 2, and further includes the following steps.

S510. The NAS storage system 100 receives a node creation request.

A user may send the node creation request to the NAS storage system 100 using a client.

The node creation request includes an identifier and path information of a newly added node of a directory tree, and the path information of the newly added node indicates all nodes on an access branch from a root node to the newly added node. The newly added node may be a directory node, or may be a file node. For example, based on the directory tree shown in FIG. 3, an identifier of the newly added node is 313, and a path of the newly added node is \310\311\313. It is determined, based on the path of the newly added node, that the newly added node is a child node 313 that is newly added below the intermediate node 311.

If the newly added node is a root node, a global ACL identifier of the directory tree is updated to an identifier including an identifier of the newly added root node. The root node that exists before the newly added root node of the directory tree is changed to a child node of the newly added root node.

In another implementation, if an identifier of each node in a path is used to represent a path of the node, the node creation request may include only a path of the newly added node, because the path of the newly added node includes the identifier of each node in the path. The identifier of the newly added node may be determined based on the path of the newly added node.

After the NAS storage system 100 receives the node creation request sent by the client, the NAS storage system 100 may back up a current global ACL such that the user recovers access permission for the directory tree based on different global ACL versions.

S520. The NAS storage system 100 stores a correspondence between the identifier and the path information of the newly added node.

In an embodiment, the NAS storage system 100 stores the correspondence between the identifier and the path information of the newly added node into the global ACL.

Optionally, the NAS storage system 100 stores the correspondence between the identifier and the path information of the newly added node into metadata of the newly added node.

In another implementation, if an identifier of each node is used to represent path information of the node, the NAS storage system 100 stores the path information of the newly added node into the global ACL or metadata of the newly added node. Therefore, in the implementation in which the identifier of each node is used to represent the path information of the node, the node may be identified by a path, to save storage space of the global ACL.

S530. The NAS storage system 100 stores a permission version number of the newly added node into the global ACL. A value of the permission version number of the newly added node is an initial value of a preset permission version number.

In an embodiment, the NAS storage system 100 stores the permission version number of the newly added node into the global ACL.

Optionally, the NAS storage system 100 stores the permission version number of the newly added node into the metadata of the newly added node.

In the present disclosure, the initial value of the preset permission version number is set to 0. The initial value of the preset permission version number of the newly added node is less than or equal to an initial value of a global version parameter. Because the permission version number of the newly added node is less than or equal to the initial value of the global version parameter, a permission version number of a node set with access permission in all nodes indicated by the path information of the newly added node is newer than the permission version number of the newly added node. Therefore, the newly added node inherits access permission for a node with a latest permission version number in all the nodes indicated by the path information of the newly added node. Therefore, when access permission is set for the newly added node, an access record of the access permission for the newly added node does not need to be stored, thereby improving efficiency of setting the access permission for the newly added node, and reducing overheads of storing the access permission for the newly added node.

After the new node is added, content of the global ACL of the directory tree of the newly added node is updated in steps S520 and S530. The updated content of the global ACL is shown in Table 5.

TABLE 5

| Global version parameter | Identifier of a node | Path | Permission version number | Permission record |
| --- | --- | --- | --- | --- |
| 0 | Root node 310 | \310 | | |
| | Intermediate node 311 | \310\311 | | |
| | Intermediate node 313 | \310\311\313 | 0 | |
| | Intermediate node 312 | \310\311\312 | | |
| | Leaf node f1 | \310\311\312\f1 | | |
| | Leaf node f2 | \310\311\312\f2 | | |
| | Leaf node f3 | \310\311\312\f3 | | |

Based on the embodiment shown in FIG. 4, after step S406, if a node is added to the directory tree, after access permission is set for the newly added node by performing steps shown in FIG. 5, content of a global ACL is shown in Table 6.

TABLE 6

| Global version parameter | Identifier of a node | Path | Permission version number | Permission record |
| --- | --- | --- | --- | --- |
| 2 | Root node 310 | \310 | | |
| | Intermediate node 311 | \310\311 | 2 | ACE1, ACE2, . . . , and ACEn |
| | Intermediate node 313 | \310\311\313 | 0 | |
| | Intermediate node 312 | \310\311\312 | | |
| | Leaf node f1 | \310\311\312\f1 | | |
| | Leaf node f2 | \310\311\312\f2 | | |
| | Leaf node f3 | \310\311\312\f3 | | |

Based on the embodiment shown in FIG. 5, the node creation request further includes data included in the newly added node. After step S510, the NAS storage system 100 stores the data into the storage array 220.

Figure 6:
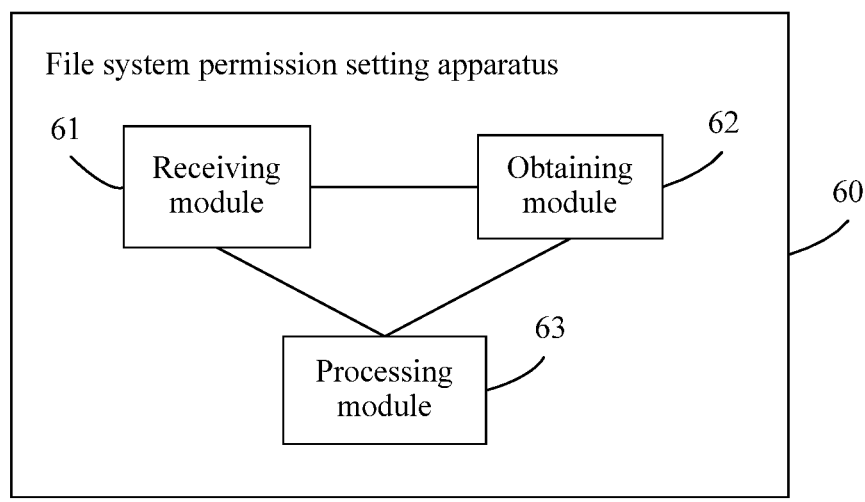
FIG. 6 is a structural diagram of a file system permission setting apparatus according to an embodiment of the present disclosure.

FIG. 6 is a structural diagram of a file system permission setting apparatus according to an embodiment of the present disclosure. The file system permission setting apparatus provided in this embodiment of the present disclosure is applied to a storage system, for example, may be applied to the NAS storage system 100. As shown in FIG. 6, a file system permission setting apparatus 60 provided in this embodiment includes a receiving module 61, an obtaining module 62, and a processing module 63. The receiving module 61 and the obtaining module 62 are connected, and the processing module 63 is separately connected to the obtaining module 62 and the receiving module 61.

In the present disclosure, the receiving module 61 is configured to receive a permission setting request. The permission setting request is used to request to set access permission for a node in a directory tree of a file system, and the permission setting request includes an identifier and a permission record that are of a node to be set with permission.

In this implementation, a function of receiving, by the receiving module 61, the permission setting request sent by the client may be implemented using the interface 211 in the NAS storage system 100. For specific implementation details of the permission setting request, refer to specific details of step S403 shown in FIG. 4. Details are not described herein again.

In the present disclosure, the obtaining module 62 is configured to obtain a currently recorded global version parameter.

In this implementation, a function of obtaining the currently recorded global version parameter by the obtaining module 62 may be implemented using the interface 212 in the NAS storage system 100, or may be implemented using the processor 213 or the control module 230 in the NAS storage system 100. For specific implementation details of obtaining the currently recorded global version parameter by the obtaining module 62, refer to specific details of step S404 shown in FIG. 4. Details are not described herein again.

In the present disclosure, the processing module 63 is configured to update the currently recorded global version parameter to obtain a latest global version parameter, and store the identifier and the permission record that are of the node to be set with permission. The latest global version parameter is used as a permission version number of the node to be set with permission. Global version parameters are set incrementally or decrementally, each global version parameter represents one permission setting operation on any node of the directory tree, and a child node of the node to be set with permission inherits a permission record obtained after a current permission setting operation on the node to be set with permission.

In this implementation, a function of updating, by the processing module 63, the currently recorded global version parameter to obtain the latest global version parameter may be implemented using the processor 213 or the control module 230 in the NAS storage system 100. For specific implementation details of updating, by the processing module 63, the currently recorded global version parameter to obtain the latest global version parameter, refer to specific details of step S405 shown in FIG. 4. Details are not described herein again.

In this implementation, a function of storing, by the processing module 63, the identifier and the permission record that are of the node to be set with permission may be implemented using the processor 213 or the control module 230 in the NAS storage system 100. For specific implementation details of storing, by the processing module 63, the identifier and the permission record that are of the node to be set with permission, and using the latest global version parameter as the permission version number of the node to be set with permission, refer to specific details of step S406 shown in FIG. 4. Details are not described herein again.

According to the file system permission setting apparatus provided in the present disclosure, a permission record of the access permission for the node of the directory tree is quickly set. The updated global version parameter is used to represent one permission setting operation on any node of the directory tree. The permission record of the child node of the node to be set with permission inherits the permission record obtained after the current permission setting operation on the node to be set with permission. Therefore, only a permission record of a parent node of the directory tree is set, and all files and all subdirectories below a directory corresponding to the parent node inherit the permission record of the parent node such that it is unnecessary to traverse all the subdirectories or files below the parent node to separately set a permission record of each subdirectory or file below the parent node, thereby improving efficiency of setting access permission for the directory tree. The permission record is set for the parent node, and the permission record does not need to be repeatedly set for the subdirectory and the file below the directory corresponding to the parent node, thereby reducing storage space overheads.

In an optional implementation, the obtaining module 62 is further configured to query a global ACL to obtain the currently recorded global version parameter. The global ACL is stored in metadata of a root node of the directory tree, and the global ACL stores the global version parameter. In this implementation, a function of querying, by the obtaining module 62, the global ACL to obtain the currently recorded global version parameter may be implemented using the interface 212 in the NAS storage system 100, or may be implemented using the processor 213 or the control module 230 in the NAS storage system 100. For specific implementation details of querying, by the obtaining module 62, the global ACL to obtain the currently recorded global version parameter, refer to specific details of step S404 shown in FIG. 4. Details are not described herein again.

In an optional implementation, the processing module 63 is further configured to create the global ACL, and set an initial global version parameter for the newly created global ACL. In this implementation, a function of creating, by the processing module 63, the global ACL, and setting the initial global version parameter for the newly created global ACL may be implemented using the processor 213 or the control module 230 in the NAS storage system 100. For specific implementation details of creating, by the processing module 63, the global ACL, and setting the initial global version parameter for the newly created global ACL, refer to specific details of steps S401 and S402 shown in FIG. 4. Details are not described herein again.

In an optional implementation, the permission setting request further includes path information of the node to be set with permission, and the path information of the node to be set with permission indicates all nodes on an access branch from the root node to the node to be set with permission. The processing module 63 is further configured to store the path information of the node to be set with permission into the global ACL. The identifier, the path information, and the permission record that are of the node to be set with permission form a correspondence.

In this implementation, a function of storing, by the processing module 63, the path information of the node to be set with permission into the global ACL may be implemented using the processor 213 or the control module 230 in the NAS storage system 100. For specific implementation details of storing, by the processing module 63, the path information of the node to be set with permission into the global ACL, refer to specific details of storing the path information of the node of the directory tree in step S403 shown in FIG. 4. Details are not described herein again.

Because the identifier, the path information, and the permission record that are of the node to be set with permission form a correspondence, and the correspondence is stored in the global ACL, the identifier, the path information, and the permission record that are of the node to be set with permission in the directory tree can be obtained by indexing only the metadata of the root node of the directory tree. This provides a simple access channel for obtaining the permission record and the path information of the node of the directory tree.

In an optional implementation, the receiving module 61 is further configured to receive a data access request. The data access request includes an identifier of a to-be-accessed node.

In this implementation, a function of receiving, by the receiving module 61, the data access request sent by the client may be implemented using the interface 211 in the NAS storage system 100. For specific implementation details of the data access request, refer to specific details of step S407 shown in FIG. 4. Details are not described herein again.

The obtaining module 62 is further configured to obtain access permission for the to-be-accessed node based on the identifier of the to-be-accessed node. When a permission version number of the to-be-accessed node is the latest in permission version numbers of the to-be-accessed node and all parent nodes of the to-be-accessed node, the access permission for the to-be-accessed node is a recorded permission record of the to-be-accessed node. When the permission version number of the to-be-accessed node is not the latest in the permission version numbers of the to-be-accessed node and all the parent nodes of the to-be-accessed node, the access permission for the to-be-accessed node inherits a permission record corresponding to a parent node that is of the to-be-accessed node and that has a latest permission version number.

In this implementation, a function of obtaining, by the obtaining module 62, the access permission for the to-be-accessed node based on the identifier of the to-be-accessed node may be implemented using the interface 212 in the NAS storage system 100, or may be implemented using the processor 213 or the control module 230 in the NAS storage system 100. For specific implementation details of obtaining, by the obtaining module 62, the access permission for the to-be-accessed node based on the identifier of the to-be-accessed node, refer to specific details of steps S408 and S409 shown in FIG. 4. Details are not described herein again.

The processing module 63 is further configured to perform authentication based on the access permission for the to-be-accessed node, and access data of the to-be-accessed node after the authentication succeeds.

In this implementation, a function of performing, by the processing module 63, authentication based on the access permission for the to-be-accessed node, and accessing the data of the to-be-accessed node after the authentication succeeds may be implemented using the processor 213 or the control module 230 in the NAS storage system 100. For specific implementation details of performing, by the processing module 63, authentication based on the access permission for the to-be-accessed node, and accessing the data of the to-be-accessed node after the authentication succeeds, refer to specific details of step S410 shown in FIG. 4. Details are not described herein again.

In an optional implementation, the obtaining module 62 is further configured to query the global ACL, determine the path information of the to-be-accessed node based on the identifier of the to-be-accessed node, query the permission version numbers of all the nodes indicated by the path information of the to-be-accessed node, determine a node with the latest permission version number, and obtain a permission record of the node with the latest permission version number. The path information of the to-be-accessed node is used to indicate the to-be-accessed node and all parent nodes of the to-be-accessed node, and the permission record of the node with the latest permission version number is the access permission for the to-be-accessed node.

In this implementation, a function of querying, by the obtaining module 62, the global ACL, and determining the path information of the to-be-accessed node based on the identifier of the to-be-accessed node may be implemented using the storage array 220 in the NAS storage system 100, or may be implemented using the controller 210, the processor 213, or the control module 230 in the NAS storage system 100. For specific implementation details of querying, by the obtaining module 62, the global ACL, and determining the path information of the to-be-accessed node based on the identifier of the to-be-accessed node, refer to specific details of step S408 shown in FIG. 4. Details are not described herein again.

In this implementation, a function of querying, by the obtaining module 62, the permission version numbers of all the nodes indicated by the path information of the to-be-accessed node, to determine the node with the latest permission version number may be implemented using the storage array 220 in the NAS storage system 100, or may be implemented using the controller 210, the processor 213, or the control module 230 in the NAS storage system 100. For specific implementation details of querying, by the obtaining module 62, the permission version numbers of all the nodes indicated by the path information of the to-be-accessed node, to determine the node with the latest permission version number, refer to specific details of step S409 shown in FIG. 4. Details are not described herein again.

In this implementation, a function of obtaining, by the obtaining module 62, the permission record of the node with the latest permission version number may be implemented using the interface 212 in the NAS storage system 100, or may be implemented using the processor 213 or the control module 230 in the NAS storage system 100. For specific implementation details of obtaining, by the obtaining module 62, the permission record of the node with the latest permission version number, refer to specific details of step S409 shown in FIG. 4. Details are not described herein again.

Optionally, modules and components in the present disclosure may be integrated together, or may be separately disposed.

In an optional implementation, the obtaining module 62 is further configured to compare, according to a preset traversal rule, the permission version numbers of all the nodes indicated by the path information of the to-be-accessed node, to determine the node with the latest permission version number. The comparing, according to the preset traversal rule, the permission version numbers of all the nodes indicated by the path information of the to-be-accessed node, to determine the node with the latest permission version number may be presetting the traversal rule based on an access permission distribution rule of the nodes in the directory tree, and determining the node with the latest permission version number by comparing, according to a proper preset traversal rule, permission version numbers of all nodes in a path of the to-be-accessed node, to improve traversal and comparison efficiency.

In this implementation, a function of comparing, by the obtaining module 62 according to the preset traversal rule, the permission version numbers of all the nodes indicated by the path information of the to-be-accessed node, to determine the node with the latest permission version number may be implemented using the storage array 220 in the NAS storage system 100, or may be implemented using the controller 210, the processor 213, or the control module 230 in the NAS storage system 100. For specific implementation details of comparing, by the obtaining module 62 according to the preset traversal rule, the permission version numbers of all the nodes indicated by the path information of the to-be-accessed node, to determine the node with the latest permission version number, refer to specific details of step S409 shown in FIG. 4. Details are not described herein again.

In an optional implementation, all nodes indicated by path information of each node in the directory tree belong to different directory levels, a directory level of a parent node in all the nodes indicated by the path information of each node in the directory tree is higher than a directory level of a child node that belongs to the parent node, the to-be-accessed node has a lowest directory level, and the root node has a highest directory level. The obtaining module 62 is further configured to select and compare, starting from the root node, permission version numbers of two nodes each time from all nodes indicated by the path information of the to-be-accessed node, to determine a node with a newer permission version number, and determine, until the to-be-accessed node is compared through traversal in descending order of the directory levels, that a node with a newer permission version number is the node with the latest permission version number.

In this implementation, a function of selecting and comparing, by the obtaining module 62 starting from the root node, permission version numbers of two nodes each time from all the nodes indicated by the path information of the to-be-accessed node, to determine a node with a newer permission version number, and determining, until the to-be-accessed node is compared through traversal in descending order of the directory levels, that a node with a new permission version number is the node with the latest permission version number may be implemented using the storage array 220 in the NAS storage system 100, or may be implemented using the controller 210, the processor 213, or the control module 230 in the NAS storage system 100. For specific implementation details of selecting and comparing, by the obtaining module 62 starting from the root node, permission version numbers of two nodes each time from all the nodes indicated by the path information of the to-be-accessed node, to determine a node with a newer permission version number, and determining, until the to-be-accessed node is compared through traversal in descending order of the directory levels, that a node with a newer permission version number is the node with the latest permission version number, refer to specific details of step S409 shown in FIG. 4. Details are not described herein again.

In an optional implementation, all nodes indicated by path information of each node in the directory tree belong to different directory levels, a directory level of a parent node in all the nodes indicated by the path information of each node in the directory tree is higher than a directory level of a child node that belongs to the parent node, the to-be-accessed node has a lowest directory level, and the root node has a highest directory level. The obtaining module 62 is further configured to select and compare, starting from the to-be-accessed node, permission version numbers of two nodes each time from all nodes indicated by the path information of the to-be-accessed node, to determine a node with a newer permission version number, and determine, until the root node is compared through traversal in ascending order of the directory levels, that a node with a newer permission version number is the node with the latest permission version number.

In this implementation, a function of selecting and comparing, by the obtaining module 62 starting from the to-be-accessed node, permission version numbers of two nodes each time from all the nodes indicated by the path information of the to-be-accessed node, to determine a node with a newer permission version number, and determining, until the root node is compared through traversal in ascending order of the directory levels, that a node with a newer permission version number is the node with the latest permission version number may be implemented using the storage array 220 in the NAS storage system 100, or may be implemented using the controller 210, the processor 213, or the control module 230 in the NAS storage system 100. For specific implementation details of selecting and comparing, by the obtaining module 62 starting from the to-be-accessed node, permission version numbers of two nodes each time from all the nodes indicated by the path information of the to-be-accessed node, to determine a node with a new permission version number, and determining, until the root node is compared through traversal in ascending order of the directory levels, that a node with a newer permission version number is the node with the latest permission version number, refer to specific details of step S409 shown in FIG. 4. Details are not described herein again.

In an optional implementation, the receiving module 61 is further configured to receive a node creation request. The node creation request includes an identifier and path information of a newly added node of the directory tree, and the path information of the newly added node indicates all nodes on an access branch from the root node to the newly added node.

In this implementation, a function of receiving, by the receiving module 61, the node creation request sent by the client may be implemented using the interface 211 in the NAS storage system 100. For specific implementation details of the node creation request, refer to specific details of step S510 shown in FIG. 5. Details are not described herein again.

The processing module 63 is further configured to store a correspondence between the identifier and the path information of the newly added node of the directory tree into the global ACL, and store a permission version number of the newly added node into the global ACL. An initial value of the permission version number of the newly added node is less than or equal to an initial value of the created global version parameter, an initial permission version number is set for the newly added node, and the initial permission version number that is set for the newly added node is less than or equal to the initial global version parameter.

In this implementation, a function of storing, by the processing module 63, the correspondence between the identifier and the path information of the newly added node of the directory tree into the global ACL may be implemented using the processor 213 or the control module 230 in the NAS storage system 100. For specific implementation details of storing, by the processing module 63, the correspondence between the identifier and the path information of the newly added node of the directory tree into the global ACL, refer to specific details of step S520 shown in FIG. 5. Details are not described herein again.

In this implementation, a function of storing, by the processing module 63, the permission version number of the newly added node into the global ACL may be implemented using the processor 213 or the control module 230 in the NAS storage system 100. For specific implementation details of storing, by the processing module 63, the permission version number of the newly added node into the global ACL, refer to specific details of step S530 shown in FIG. 5. Details are not described herein again.

The present disclosure provides a file system permission setting method and apparatus. The method is performed by a storage system, and the method is further applied to the storage system. The method includes receiving, by the storage system, a permission setting request, where the permission setting request is used to request to set access permission for a node in a directory tree of a file system, and the permission setting request includes an identifier and a permission record that are of a node to be set with permission. After the storage system receives the permission setting request, the storage system obtains a currently recorded global version parameter, and updates the currently recorded global version parameter to obtain a latest global version parameter. The storage system stores the identifier and the permission record that are of the node to be set with permission, and uses the latest global version parameter as a permission version number of the node to be set with permission. Global version parameters are set incrementally or decrementally, and each global version parameter represents one permission setting operation on any node of the directory tree. A child node of the node to be set with permission inherits a permission record obtained after a current permission setting operation on the node to be set with permission. According to the file system permission setting method provided in the present disclosure, a permission record of access permission for the node of the directory tree is quickly set. The updated global version parameter is used to represent one permission setting operation on any node of the directory tree. In this method, the permission record of the child node of the node to be set with permission inherits the permission record obtained after the current permission setting operation on the node to be set with permission. Therefore, only a permission record of a parent node of the directory tree is set, and all files and all subdirectories below a directory corresponding to the parent node inherit the permission record of the parent node such that it is unnecessary to traverse all the subdirectories or files below the parent node to separately set a permission record of each subdirectory or file below the parent node, thereby improving efficiency of setting access permission for the directory tree. The permission record is set for the parent node, and the permission record does not need to be repeatedly set for the subdirectory and the file below the directory corresponding to the parent node, thereby reducing storage space overheads.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an embodiment to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to the other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

What is claimed is:

1. A data access method, implemented by a file system, comprising:
   receiving a data access request, wherein the data access request comprises an identifier of a to-be-accessed node;
   obtaining access permission for the to-be-accessed node based on the identifier of the to-be-accessed node, wherein the access permission inherits a permission record corresponding to a parent node that is of the to-be-accessed node and that has a latest permission version number when a permission version number of the to-be-accessed node is not the latest in permission version numbers of all nodes indicated by path information of the to-be-accessed node; and
   performing authentication based on the access permission; and
   accessing data of the to-be-accessed node after the authentication succeeds.

2. The data access method of claim 1, wherein the access permission is a recorded permission record of the to-be-accessed node when the permission version number of the to-be-accessed node is the latest in the permission version numbers of all the nodes indicated by the path information of the to-be-accessed node.

3. The data access method of claim 2, wherein obtaining the access permission based on the identifier of the to-be-accessed node comprises:
   querying a global access control list;
   determining the path information of the to-be-accessed node based on the identifier of the to-be-accessed node, wherein the path information of the to-be-accessed node indicates the to-be-accessed node and the parent node of the to-be-accessed node;
   querying the permission version numbers of all the nodes indicated by the path information of the to-be-accessed node to determine a node with the latest permission version number; and
   obtaining a permission record of the node with the latest permission version number, wherein the permission record of the node with the latest permission version number is the access permission.

4. The data access method of claim 3, wherein querying the permission version numbers of all the nodes indicated by the path information of the to-be-accessed node, to determine the node with the latest permission version number comprises comparing, according to a preset traversal rule, the permission version numbers of all the nodes indicated by the path information of the to-be-accessed node to determine the node with the latest permission version number.

5. The data access method of claim 4, further comprising:
   receiving a node creation request, wherein the node creation request comprises an identifier and path information of a newly added node of a directory tree, wherein the path information of the newly added node indicates all nodes on an access branch from a root node to the newly added node;
   storing a correspondence between the identifier and the path information of the newly added node of the directory tree into the global access control list; and setting an initial permission version number for the newly added node, wherein the initial permission version number that is set for the newly added node is less than or equal to an initial global version parameter.

6. The data access method of claim 5, wherein the data that is accessed further comprises metadata, wherein the metadata comprises standard attribute data configured to describe standard attributes such as size and modification time of the data, extended attribute data configured to describe the access permission for the node, and layout attribute data configured to describe a storage location of the data.

7. The data access method of claim 6, wherein the permission record comprises an access control entry, wherein the access control entry is configured to record an access permission type of the node, an object that accesses the node, and access permission of the object that accesses the node.

8. A data access apparatus for a file system, comprising:
an interface configured to receive a data access request, wherein the data access request comprises an identifier of a to-be-accessed node;
a processor coupled to the interface; and
a memory coupled to the processor and storing instructions that, when executed by the processor, cause the processor to be configured to:
obtain access permission for the to-be-accessed node based on the identifier of the to-be-accessed node;
perform authentication based on the access permission; and
access data of the to-be-accessed node after the authentication succeeds, wherein the access permission inherits a permission record corresponding to at least one parent node that is of the to-be-accessed node and that has a latest permission version number when a permission version number of the to-be-accessed node is not the latest in permission version numbers of all nodes indicated by path information of the to-be-accessed node.

9. The data access apparatus of claim 8, wherein the access permission is a recorded permission record of the to-be-accessed node when the permission version number of the to-be-accessed node is the latest in the permission version numbers of all the nodes indicated by the path information of the to-be-accessed node.

10. The data access apparatus of claim 9, wherein the instructions further cause the processor to be configured to:
query a global access control list;
determine the path information of the to-be-accessed node based on the identifier of the to-be-accessed node;
query the permission version numbers of all the nodes indicated by the path information of the to-be-accessed node to determine a node with the latest permission version number; and
obtain a permission record of the node with the latest permission version number, wherein the permission record of the node with the latest permission version number is the access permission, and the path information of the to-be-accessed node indicates the to-be-accessed node and the at least one parent node of the to-be-accessed node.

11. The data access apparatus of claim 10, wherein the instructions further cause the processor to be configured to compare, according to a preset traversal rule, the permission version numbers of all the nodes indicated by the path information of the to-be-accessed node, to determine the node with the latest permission version number.

12. The data access apparatus of claim 11, wherein the interface is further configured to receive a node creation request, wherein the node creation request comprises an identifier and path information of a newly added node of a directory tree, wherein the path information of the newly added node indicates all nodes on an access branch from a root node to the newly added node, wherein the processor is further configured to:
store a correspondence between the identifier and the path information of the newly added node of the directory tree into the global access control list;
store a permission version number of the newly added node into the global access control list, wherein an initial value of the permission version number of the newly added node is less than or equal to an initial value of a created global version parameter; and
set an initial permission version number for the newly added node, wherein the initial permission version number that is set for the newly added node is less than or equal to an initial global version parameter.

13. The data access apparatus of claim 12, wherein the instructions further cause the processor to be configured to access metadata, wherein the metadata comprises standard attribute data configured to describe standard attributes such as size and modification time of the data, extended attribute data configured to describe the access permission for the node, and layout attribute data configured to describe a storage location of the data.

14. The data access apparatus of claim 13, wherein the permission record comprises an access control entry, wherein the access control entry is configured to record an access permission type of the node, an object that accesses the node, and access permission of the object that accesses the node.

15. A computer program product comprising computer-executable instructions stored on a non-transitory computer-readable medium that, when executed by a processor, cause a data access apparatus to:
receive a data access request, wherein the data access request comprises an identifier of a to-be-accessed node;
obtain access permission for the to-be-accessed node based on the identifier of the to-be-accessed node, performing authentication based on the access permission, and access data of the to-be-accessed node after the authentication succeeds, wherein the access permission for the to-be-accessed node inherits a permission record corresponding to a parent node that is of the to-be-accessed node and that has a latest permission version number when a permission version number of the to-be-accessed node is not the latest in permission version numbers of all nodes indicated by path information of the to-be-accessed node.

16. The computer program product of claim 15, wherein the access permission for the to-be-accessed node is a recorded permission record of the to-be-accessed node when the permission version number of the to-be-accessed node is the latest in the permission version numbers of all the nodes indicated by the path information of the to-be-accessed node.

17. The computer program product of claim 16, wherein the instructions further cause the data access apparatus to be configured to:
query a global access control list;
determine the path information of the to-be-accessed node based on the identifier of the to-be-accessed node;

query the permission version numbers of all the nodes indicated by the path information of the to-be-accessed node to determine a node with the latest permission version number; and obtain a permission record of the node with the latest permission version number, wherein the permission record of the node with the latest permission version number is the access permission, wherein the path information of the to-be-accessed node indicates the to-be-accessed node and all parent nodes of the to-be-accessed node.

18. The computer program product of claim 17, wherein the instructions further cause the data access apparatus to be configured to compare, according to a preset traversal rule, the permission version numbers of all the nodes indicated by the path information of the to-be-accessed node, to determine the node with the latest permission version number.

19. The computer program product of claim 18, wherein the instructions further cause the data access apparatus to be configured to:

receive a node creation request, wherein the node creation request comprises an identifier and path information of a newly added node of a directory tree, wherein the path information of the newly added node indicates all nodes on an access branch from a root node to the newly added node;

store a correspondence between the identifier and the path information of the newly added node of the directory tree into the global access control list;

store a permission version number of the newly added node into the global access control list, wherein an initial value of the permission version number of the newly added node is less than or equal to an initial value of a created global version parameter; and set an initial permission version number for the newly added node, wherein the initial permission version number that is set for the newly added node is less than or equal to an initial global version parameter.

20. The computer program product of claim 19, wherein the instructions further cause the data access apparatus to be configured to access metadata, wherein the metadata comprises standard attribute data configured to describe standard attributes such as size and modification time of the data, extended attribute data configured to describe the access permission for the node, and layout attribute data configured to describe a storage location of the data.

* * * * *